UNITED STATES PATENT OFFICE.

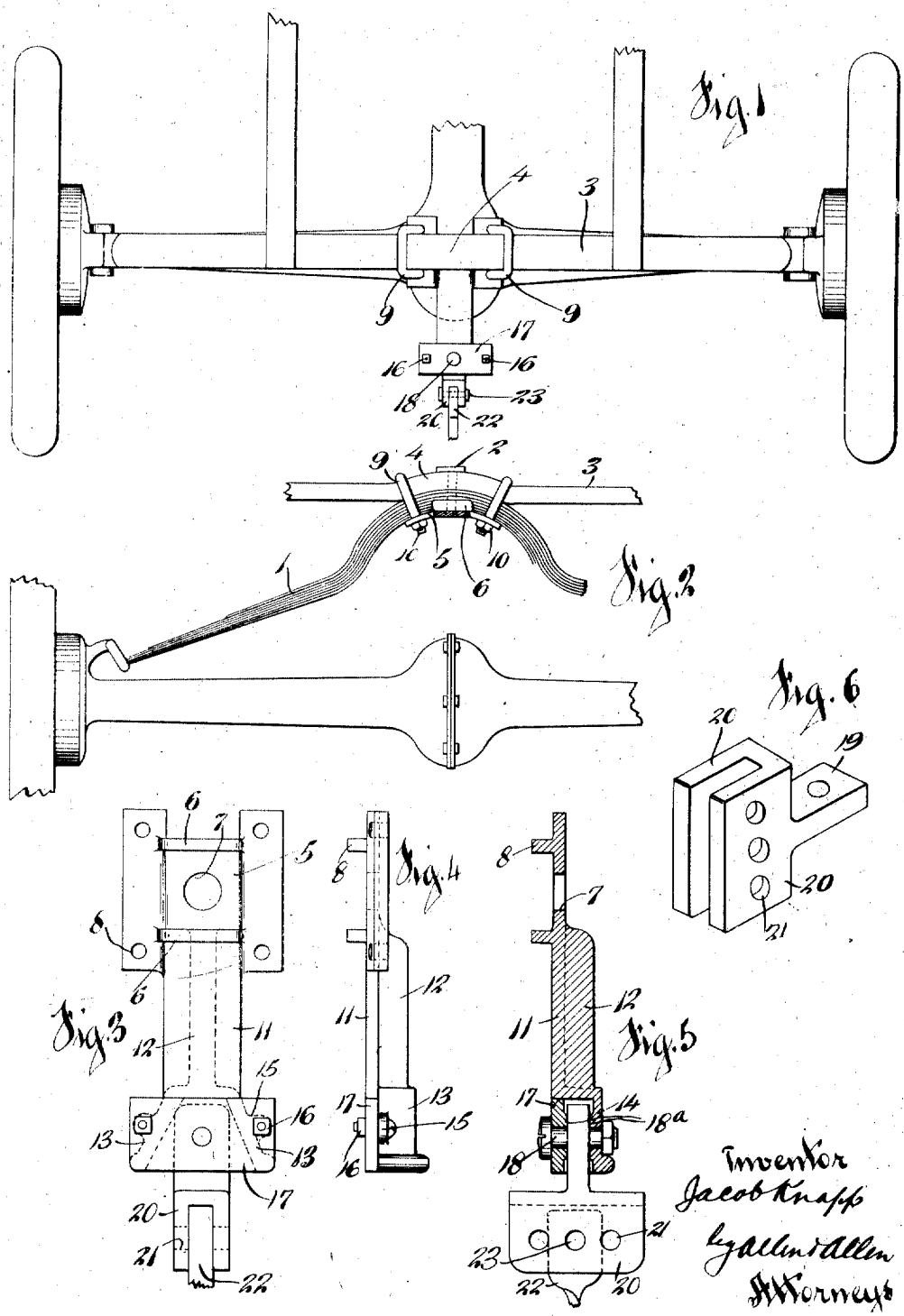

JACOB KNAPP, OF CINCINNATI, OHIO, ASSIGNOR TO THE SECHLER AND COMPANY, OF CINCINNATI, OHIO, A CORPORATION OF OHIO.

COUPLING-BAR FOR AUTOMOBILE-TRAILERS.

1,250,899.   Specification of Letters Patent.   Patented Dec. 18, 1917.

Application filed July 14, 1915. Serial No. 39,749.

*To all whom it may concern:*

Be it known that I, JACOB KNAPP, a citizen of the United States, and a resident of the city of Cincinnati, in the county of Hamilton and State of Ohio, have invented certain new and useful Improvements in Coupling-Bars for Automobile-Trailers, of which the following is a full, clear, and exact description, reference being had to the accompanying drawings, forming part of this specification.

My invention relates to bars for connecting up to an automobile, particularly a Ford automobile, the draw bar of a trailer. It has as its object the providing of a simple and durable bar which is particularly adapted for attachment to the rear frame of an automobile which, as in the Ford, has the rear spring bolted at the middle of the frame. It has also as its object the providing of a coupling bar in which there may be adjustment for proper height of the pivotal point of connection with the draw bar of a trailer.

These objects are accomplished by that certain construction and arrangement of parts to be hereinafter more specifically pointed out and claimed.

In the drawings,

Figure 1 is a top plan view of the coupling bar in place.

Fig. 2 is a rear elevation of the same.

Fig. 3 is a bottom plan view of the bar.

Fig. 4 is a side elevation thereof.

Fig. 5 is a longitudinal section thereof showing the adjustment piece in place.

Fig. 6 is a perspective view of the adjustment piece.

The rear spring 1 of the automobile curves upwardly at the middle and is attached by a bolt 2 to the cross piece 3 of the rear frame of the automobile. The frame piece is slightly curved upwardly at 4 at this point of attachment to form a bearing surface for the spring.

The coupling bar is provided with a wide portion for attachment to the automobile, which is curved at its upper face at 5 to lie flush with the spring 1 at the middle of its curve. This portion has on its under side the flanges 6, 6, to lie one on each side of the under side of the spring, and a central aperture 7 to clear the bolt 2. At each side of this portion are provided the holes 8, 8, which are slantingly inclined owing to the curve of the plate, and the clips 9, 9, are provided to clamp over the frame piece, with their ends passing through the said holes, and tightened in place by means of nuts 10. The clips will be slantingly disposed and the parts are proportioned so that they will engage over the base of the curve 4 of the frame piece. This curve in the frame piece thus works together with the clips to hold the bar tightly in place on the automobile.

The bar has a shank portion 11 reinforced with a rib 12, and the shank terminates in a flaring portion having side walls 13, 13, and a base 14. The side walls have lugs 15, 15, on them which serve to receive the bolts 16, 16, which are employed to secure over the top of the flaring portion a cover plate 17. The base of the flaring portion has a central aperture and the cover plate has a corresponding aperture for the pivot bolt 18. Around these apertures on the inside of the housing so formed are bosses 18$^a$, 18$^a$, which form a rounded contact for the draw bar, which is inserted therein. It can be seen that these rounded contacts will allow a twisting and rocking of the draw bar which would be impossible were they not provided.

It is readily possible to secure the draw bar of the trailer for the automobile to this coupling bar by inserting its end into the housing formed as described, and to secure said draw bar pivotally by means of the pivot bolt 18, the bolt being loose in the eye of the draw bar to allow for slight twisting. But it is preferred to provide a means for adjusting the height of the pivotal point of the draw bar so as to avoid chance of downward or upward pull on the part of the tractor automobile.

For this purpose a bifurcated coupling piece is provided, comprising a flat end 19 for securing by the pivot bolt and the two parallel vertical walls 20, 20. These walls are pierced with proper corresponding holes 21, 21, and the end 22 of the draw bar of the trailer is inserted between these walls and pivotally held in place by a bolt 23 inserted through any desired pair of corresponding holes. It is thus obvious that vertical adjustment of the pivotal point of the draw bar is gained and also that vertical as well as horizontal motion is permitted to the draw bar, there being two pivot points at right angles to each other.

The coupling bar owing to its special construction is adapted to attachement to an automobile having the rear frame and spring structure above described, which is to be found particularly in the Ford car of extensive use at the present time, and it has been difficult in the past to securely accomplish attachment of a trailer to a Ford car because of its special construction. The adjustable means for coupling the draw bar giving pivotal connection on two planes is of course adaptable to any form of car.

Having thus described my invention, what I claim as new and desire to secure by Letters Patent, is:—

1. In a coupling bar for coupling a trailer to the central portion of a frame piece which has an upward curve and is bolted to an upwardly curving spring at the point of attachment, a curved plate to lie along the curve beneath the spring, an aperture therein for clearance of the bolt, and lateral extending portions having slanting holes therein to accommodate clips for engaging over the base of the curve of the frame portion and flanges on said plate to engage on each side of the spring, as and for the purpose described.

2. In a coupling bar for coupling a trailer to an automobile, a member for mounting the bar on the frame of the automobile, means for mounting a pivot bolt vertically at the end of the bar, and a bifurcated piece secured to the end of the bar by said bolt, having walls in planes parallel to the pivot bolt, pierced with a series of corresponding apertures to adjustably mount a second pivot bolt therein for securing the end of a trailer draw bar.

3. In a coupling bar for coupling a trailer to an automobile, a member for mounting the bar on the frame of the automobile, a flaring housing on the end of the bar, having an open end and a pivot bolt mounted vertically in said housing, and a bifurcated piece secured by said pivot bolt in the housing, said piece having walls in a vertical plane, said walls pierced with a series of corresponding apertures to adjustably mount a second pivot bolt therein for securing the end of a trailer draw bar.

4. In a coupling bar for coupling a trailer to an automobile, a member for mounting the bar on the frame of the automobile, a housing on the end of the bar having an open end and flaring horizontally and a pivot bolt mounted vertically in said housing, a trailer draw bar; said mounting member being adapted to receive the end of said trailer draw bar, bosses in the housing around the pivot hole, to provide a rounded contact for the draw bar end and a horizontal pivot in the draw bar beyond the housing, for the purpose described.

JACOB KNAPP.